United States Patent [19]

Vano

[11] 4,223,357

[45] Sep. 16, 1980

[54] FACSIMILE RECORDER WITH SWEEP RATE DETECTION

[75] Inventor: Gerald L. Vano, Brockton, Mass.

[73] Assignee: Alden Research Foundation, Brockton, Mass.

[21] Appl. No.: 953,468

[22] Filed: Oct. 23, 1978

[51] Int. Cl.² ............................................ H04N 1/36
[52] U.S. Cl. .................................. 358/264; 358/267; 358/285
[58] Field of Search ............... 358/264, 267, 268, 257, 358/285, 288, 148; 331/20, 21, 172; 328/179; 361/243; 235/92 P, 92 TF; 320/1

[56] References Cited

U.S. PATENT DOCUMENTS

| 2,873,315 | 2/1959 | Fricks | 358/268 |
| 3,492,424 | 1/1970 | Hare et al. | 358/148 |
| 3,510,057 | 5/1970 | Werme | 320/1 |
| 3,761,610 | 9/1973 | Krallinger et al. | 358/257 |
| 3,831,091 | 8/1974 | Kanitz et al. | 358/257 |

Primary Examiner—Robert L. Griffin
Assistant Examiner—Joseph A. Orsino, Jr.

Attorney, Agent, or Firm—James H. Grover

[57] ABSTRACT

A facsimile recorder having the capacity to record signals at different sweep rates and a circuit to distinguish noise from synchronization pulses so that the correct sweep rate will be utilized. The circuit includes a grounded timer switch which receives a start signal and opens to the voltage of the circuit and another switch which is opened to ground during the period between each of the phasing pulses. Two capacitors are arranged in parallel to receive a charge simultaneously while the switch is opened but a diode between them allows discharge of only the first of them when there is an interruption due to either noise or the next synchronization pulse. Since the rate of charge on the capacitors is substantially linear with respect to time, the charge on the second capacitor will remain at the highest level seen between the end of one pulse and a burst of noise or the next pulse if there is no noise. The voltage of the second capacitor is displayed to level detectors which signal a logic circuit in the recording equipment to direct the sweep rate of the recorder.

14 Claims, 2 Drawing Figures

//patent column 1

FACSIMILE RECORDER WITH SWEEP RATE DETECTION

BACKGROUND OF THE INVENTION

Facsimile recorders as contemplated by the present invention receive data from a transmitter and convert the signal to electrical impulses that are recorded on a web of electrolytic recording paper. Such devices feed the web of recording paper between a pair of opposing electrodes, one of which is fixed and the other of which sweeps across the paper. As electrical impulses occur across the electrodes during the sweep, the web of electrolytic paper which is disposed therebetween will discolor and marks will be made. A series of marks will form a line by line representation of the graphic information which is being transmitted.

The facsimile messages are sent at predetermined speeds or sweep rates in order to effectively utilize the transmission medium. Prior to the transmission of a message, these sweep rates are selected by an operator of the transmitting unit and generally are a function of the density of the information to be transmitted and the capacity of the communications link which will receive the information. Recorders which receive these transmissions function unattended and hence must be able to commence operation when a signal is received for starting and also operate at the sweep rate that is being utilized by the operator of the transmitting unit. Prior to sending the information, the operator of the transmitter will send a starting signal followed by a series of control phasing pulses which are transmitted once during each sweep of a line of the graphic information. Before graphic information is transmitted, these pulses are sent with no information between them and in this way, the equipment can be told the sweep rate that it must utilize in order to record the graphic information correctly.

DESCRIPTION OF THE PRIOR ART

The practice usually utilized by manufacturers of graphic recorders to determine the proper sweep rate has been a frequency meter pulse counter which recognizes the number of line pulses produced by the transmitter in a given period of time and then converts this information to adjust the sweep rate.

STATEMENT OF THE INVENTION

When electronic equipment is used to count the number of phasing pulses produced by the transmitter in a given period of time, it is difficult for the equipment to distinguish between the phasing pulses and bursts of noise that may occur in the transmission. If noise occurs between phasing pulses, the recorder will count this burst as a pulse and can select an incorrect sweep rate for the graphic recorder to operate. While noise immunization techniques can be utilized to eliminate such noise, the equipment necessary to do so is quite costly.

According to the present invention, I have discovered a mechanism to distinguish between phasing pulses and the bursts of noise and a way to discount the bursts so that the equipment will set itself to operate at the sweep rates determined by the transmitter. My invention includes a receiver of a start signal which commences operation of the recorder and a first switch which is normally grounded, but opens upon receiving the start signal. Preferably the first switch is a timer which opens after the start signal has been received for a predetermined short period equivalent to several phasing pulses. A second switch, generally a transistor, is connected to receive a series of uniformly spaced synchronization pulses which are generated by the phasing pulses. The second switch is normally open but conducts to ground during reception of synchronization pulses. If noise is received between synchronization pulses, a false synchronization pulse is produced and the switch also closes to ground. A first and a second capacitor are arranged in parallel to each other and in parallel with the second switch. The capacitors receive a charge simultaneously while the second switch means is open. A unidirectional conductor is disposed between these capacitors and is arranged to prevent the second capacitor from discharging when the first capacitor discharges during the period that the timer is open. The first capacitor is connected to discharge whenever the second switch is closed, that is when synchronization pulse or false synchronization pulse is received. Since the second capacitor is blocked from discharging when the first capacitor discharges, and since the level of charge of both capacitors is a function of the time interval between signals, the second capacitor will charge to a maximum level that can be attained between two synchronization pulses if no noise occurs. If noise does occur between two synchronization pulses, the first capacitor will discharge leaving the second capacitor with the highest voltage that it was able to attain during any of the periods of time between the synchronization pulses.

While the second capacitor is charging, it gradually changes the voltage bias on the gate of a field effect transistor (FET), which in turn is displayed to level detectors. A signal from the level detectors initiates the movement of the scanning electrode through a logic circuit, the lowest level of voltage operating the equipment at its highest speed. If the second capacitor continues to charge, the voltage bias on the gate increases and displays a higher voltage to the level detectors, thereby reducing the speed of the scanning electrode.

At the expiration of the predetermined time, the timer is again grounded which prevents further charging of the first capacitor. Since the second capacitor is isolated from the first capacitor and also from the timer, it will retain its bias and will allow a resistor connected between ground and the gate of the FET to display a continuous voltage to the level detectors which, in turn, controls the speed of the scanning electrode.

DRAWINGS

DESCRIPTION OF THE PREFERRED EMBODIMENT

Figure 1:
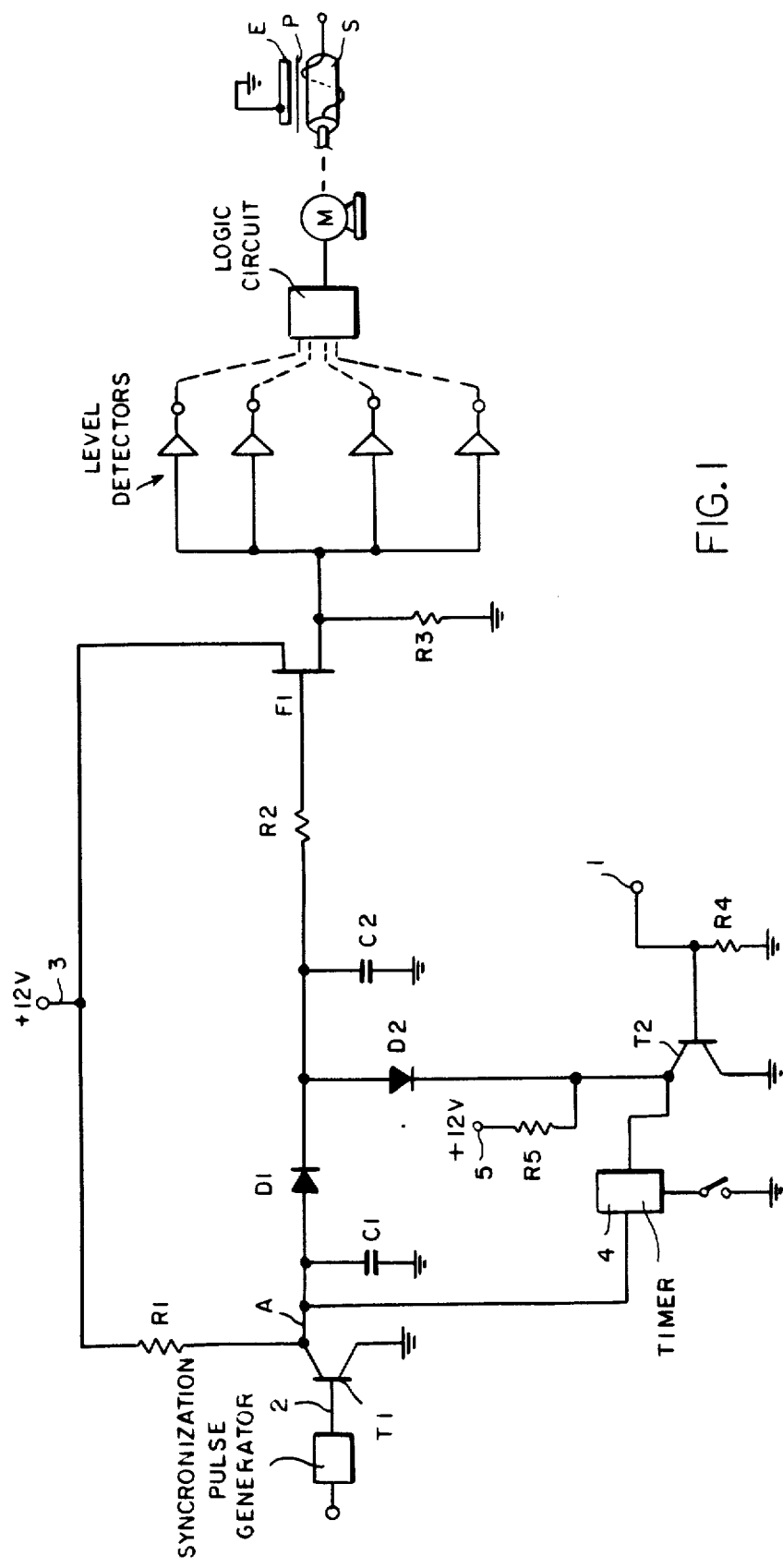
FIG. 1 is a schematic illustration of the circuitry of the present invention for directing the sweep rate of a scanning electrode of a facsimile recorder.

Referring now to FIG. 1, before receiving a start signal and phasing pulses, the graphic recording equipment is dormant and no transmission is being received. A start signal, generally a tone of predetermined amplitude for a predetermined time, for example 300 hertz for 3 to 5 seconds, is received at a start input terminal 1, and the end of the start signal will close transistor $T_2$ (2N3904) thereby discharging capacitor $C_2$ (47 microfarads) since a short exists between the positive side of capacitor $C_2$ through transistor $T_2$ to ground. At the same time, a four second timer 4 (LM 555 Manufactured by Signetics Corp.) is opened by a signal from the collector of transistor $T_2$ and isolates point A from ground. A resistor $R_4$ (10 kilohms) biases transistor $T_2$ close to its conduction threshold. A series of synchronization pulses are generated from phasing pulses and received from the scanner which, in turn, are applied to input terminal 2 at the base of the transistor $T_1$ (2N3904). One phasing pulse is transmitted for every scan line made by the transmitter. Hence the faster the transmission rate selected, the more pulses per unit of time or conversely, the slower the transmission rate selected, the fewer pulses per unit of time. When the synchronization pulses are received at the base of transistor $T_1$, they momentarily close transistor $T_1$ which grounds junction A thereby discharging capacitor $C_1$ (150 microfarads). After a synchronization pulse and for a period of time between successive synchronization pulses transistor $T_1$ will open and hence both the capacitors $C_1$ and $C_2$ charge from a 12 V power supply 3 through a resistor $R_1$ (2.7 kilohms). The next synchronization pulse will again momentarily close transistor $T_1$ thereby discharging capacitor $C_1$ which will begin again to charge after transistor $T_1$ opens following the synchronization pulse. The charge of capacitor $C_1$ from the voltage supply 3 is directly proportional to the time period between synchronization pulses and the resistor $R_1$ is connected between the power supply and the capacitors $C_1$ and $C_2$ and determines the slope of the sawtoothed wave and hence the maximum voltage at point A. Capacitor $C_2$ will charge to the highest value as seen at point A and will hold this charge because capacitor $C_2$ is isolated from capacitor $C_1$ by a diode $D_1$ (1N914).

Figure 2:
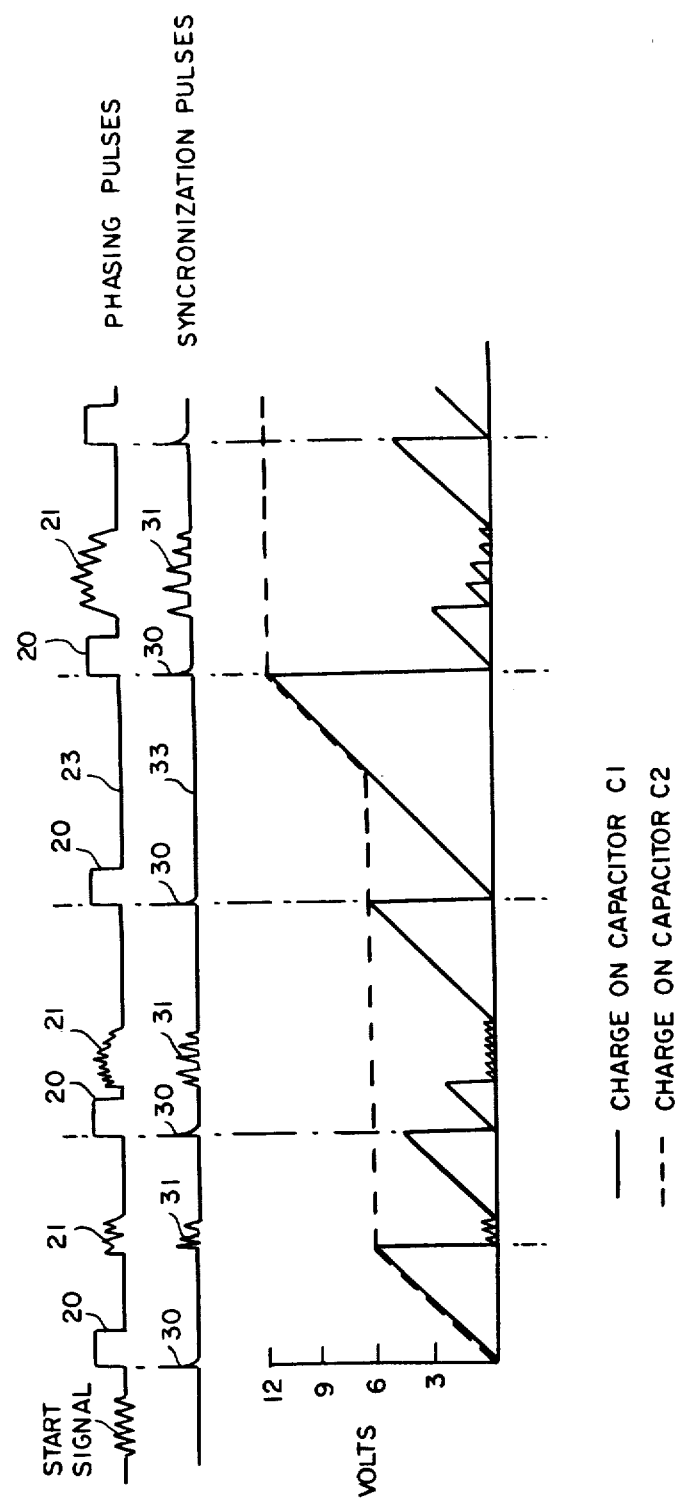
FIG. 2 are curves of voltage wave forms and their effect upon charging of the capacitors in the circuit of FIG. 1.

Referring to FIG. 2 as an example, the phasing pulses 20 are received at the synchronization pulse generator (in FIG. 1) at regular predetermined time intervals to produce synchronization pulses 30. If there is a burst of noise 21 between the phasing pulses 20, a false synchronization pulse 31 will be produced. When false synchronization pulse 31 due to noise is received, transistor $T_1$ will close and discharge capacitor $C_1$ prematurely as shown by the sharp decline of the solid line. Following a false synchronization pulse 31 by noise, capacitor $C_1$ will again begin to charge until the next synchronization pulse 30 is received. At the same time, the charge on capacitor $C_2$ (as indicated by the dash line) will initially raise to the highest value of charge on capacitor $C_1$, but will not discharge due to the positioning of diode $D_1$ and hence will continue to hold the highest charge on capacitor $C_2$ as indicated by the dash line.

During the reception of phasing pulses 20, it is assumed that in the sampling time of four seconds there will be at least one interval 23 between phasing pulses in which there will be no noise. Since capacitor $C_2$ will retain its charge, it will raise to the maximum that occurs between two phasing pulses 23 with no noise therebetween as indicated by the dash line rising to the 12 V level. Hence the highest voltage at junction A and thus the charge on capacitor $C_2$ will be determined by the repetition rate of the phasing pulses, that is the longer the time interval between pulses the higher the voltage. If a burst of noise 21 closes transistor $T_1$ prematurely, that is before the next expected phasing pulse 20, the voltage at junction A will be less than it would be if noise were not present.

At the end of the four second time period, the timer 4 closes, thereby shorting capacitor $C_1$. Diodes $D_1$ and $D_2$ (1N914) prevent capacitor $C_2$ from discharging through ground and the 12 V source 5 applies a reverse bias through resistor $R_5$ (10 kilohms) on diode $D_2$ (1N914) so that capacitor $C_2$ will not discharge. The charge on capacitor $C_2$ will bias the gate of an FET $F_1$ (2N485) and depending upon the peak voltage of capacitor $C_2$, FET $F_1$ will vary its resistance between ground and the 12 V operating voltage of the circuit through resistor $R_3$ (10 kilohms). Four level detectors in IC unit (LM339 manufactured by Signetics Corp.) are connected to the FET $F_1$ and a voltage proportional to the voltage of capacitor $C_2$ will be displayed to the unit. The unit is a four component package with the voltages set at about 90% of the expected voltage, i.e. 11, 8, 5 and 2 V and set to detect the unique highest voltage that occurs during the four second time period which is stored in the capacitor $C_2$. This unique voltage will activate a logic circuit which sets the correct scanning rate of recording equipment such as described in the U.S. patents to Williams Nos. 4,104,644 or 4,060,815, in which paper P is drawn between a linear electrode E and a scanning electrode S and in which the speed that the scanning electrode is moved is determined by motor M.

The charges are set out in the following table.

| Charge (Volts) | Scans per minute |
| --- | --- |
| 12 | 60 |
| 9 | 90 |
| 6 | 120 |
| 3 | 180 |

It is apparent that modications and changes can be made within the spirit and scope of the present invention. However, it is my intention only to be limited by the scope of the appended claims.

I claim:

1. In a facsimile recorder of electrical signals including means for receiving a series of control pulses occurring at one of several regular intervals, and graphic information for recording on a web, the recorder including a scanning electrode effectively traversing the paper and means to drive the electrode at various speeds, a control circuit comprising:
    a first voltage storage means;
    means for charging the storage means;
    switch means responsive to a received control pulse to discharge the storage means after a voltage rise thereon dependent on the interval between control pulses; and
    control means coupled to the storage means for sensing the maximum voltage rise thereon and controlling the scanning electrode drive means to drive the electrode at a speed proportional to the frequency of the control pulses, including means converting the maximum voltage rise to a control signal selecting the scanning electrode driving speed.

2. the recorder according to claim 1 further including memory means for storing the maximum voltage producing between control pulses.

3. The recorder according to claim 2 wherein the memory means further includes a second voltage storage means connected in parallel with said first voltage storage means and arranged to change from said charging means.

4. The recorder according to claim 2 wherein the control means includes a plurality of level detectors connected in series with said memory means.

5. The recorder according to claim 2 wherein the memory means includes a second voltage storage means connected in parallel with said first voltage storage means and connected to charge from said charging means; and the control means includes a plurality of level detectors arranged in series with said second voltage storage means.

6. The recorder according to claim 5 wherein gate means is disposed between the second voltage storage means and the level detectors, whereby the charge on the second voltage storage means is displayed to the level detectors.

7. The recorder according to claim 3 further including unidirectional conducting means connected between the first and second voltage storage means and arranged to prevent the second voltage storage means from discharging when the first voltage storage means discharges.

8. The recorder according to claim 2 wherein the memory means includes a second voltage storage means connected in parallel with said first voltage storage means; and unidirectional conducting means connected between the first and second voltage storage means and arranged to prevent the second voltage storage means from discharging when the first voltage storage means discharges; and a plurality of level detectors connected in series with the second voltage storage means.

9. The recorder according to claim 8 wherein gate means is disposed between the second voltage storage means and the level detectors, whereby the charge on the second voltage storage means is displayed to the level detectors.

10. The recorder according to claim 1 further including a second switch means arranged to open at the end of a start signal, said second switch being connected to allow said first voltage storage means to charge.

11. The recorder according to claim 10 wherein said second switch is a timer, said timer being open for a predetermined time sufficient to sample a sufficient number of control pulses so as to find at least one interval between two control pulses that will be uninterrupted by noise.

12. The recorder according to claim 10 wherein said second switch is a timer arranged to open when a third switch senses the end of said start signal.

13. The recorder according to claim 1 wherein a resistor is disposed in series between the storage charging means and the storage means so as to regulate the charge rate of the capacitors into a generally sawtooth wave form.

14. The recorder according to claim 3 being further responsive to a start signal and including electronic valve means connected to normally block the second storage means from discharging, the valve means being responsive to a start signal to discharge the second storage means before a predetermined interval of control pulse sampling.

* * * * *